Sept. 30, 1930.  L. VIELBIG  1,776,961
CUTTING BOARD
Filed Nov. 28, 1928

INVENTOR.
Leonard Vielbig,
BY
ATTORNEY.

Patented Sept. 30, 1930

1,776,961

UNITED STATES PATENT OFFICE

LEONARD VIELBIG, OF MADISON, NEW JERSEY

CUTTING BOARD

Application filed November 28, 1928. Serial No. 322,487.

This invention relates to cutting boards, adapted particularly to be used in cutting bread, meats and other food stuffs, the primary object of the invention being to provide a board of such character that the upper or cutting surface thereof may at all times be kept free of crumbs and other food particles and whereby such crumbs or particles or meat or vegetable juices will not be permitted to accumulate upon the cutting surface of the board nor permitted to run therefrom upon the table or other support for the board.

A further object of the invention is to provide a cutting board constructed in such manner as to be capable of fully accomplishing the above results and which may be readily cleaned and at all times easily maintained in thoroughly sanitary condition.

A still further object of the invention is to provide means associated with a cutting board whereby crumbs, food particles and juices will be collected at the time of the cutting operation and properly confined so as to be easily and quickly disposed of in an unobjectionable and work saving manner.

A still further object is to provide a cutting board characterized as above and for the objects set forth which may be manufactured at small cost, which is composed of but few simple and readily assembled parts, which has its parts so constructed and arranged as to preclude the possibility of wear, breakage or derangement, which may be manufactured and retailed at low cost, and which will prove thoroughly practical and efficient for the purposes outlined.

With these objects in view, together with others which will appear as the description proceeds, the invention consists in the novel construction, combination and arrangement of parts, all as will be described more fully hereinafter, illustrated in the drawings, and particularly pointed out in the claims.

Figure 1:
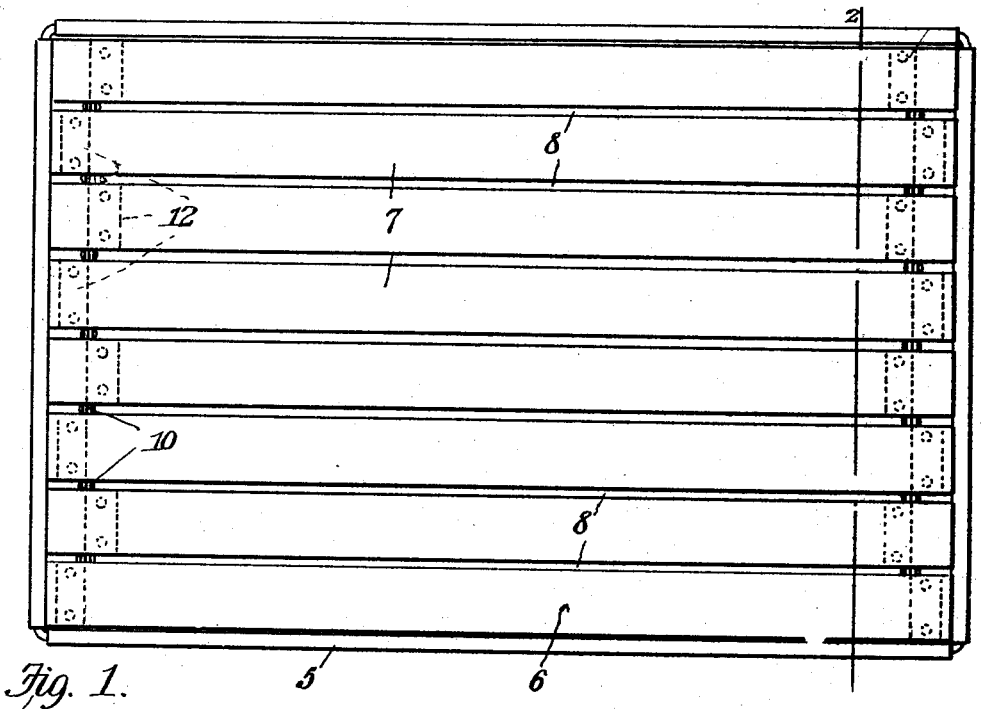
Fig. 1 is a top plan view of a cutting board constructed in accordance with the invention.
Figure 2:
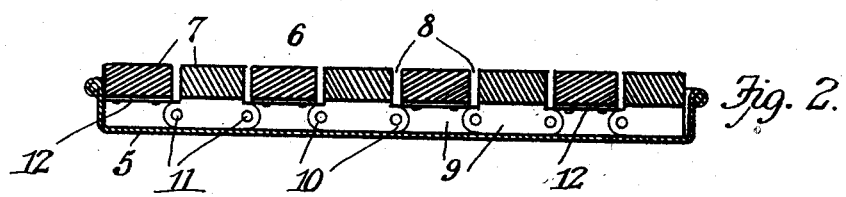
Fig. 2 is a sectional view taken substantially upon the line 2—2 of Fig. 1.
Figure 3:
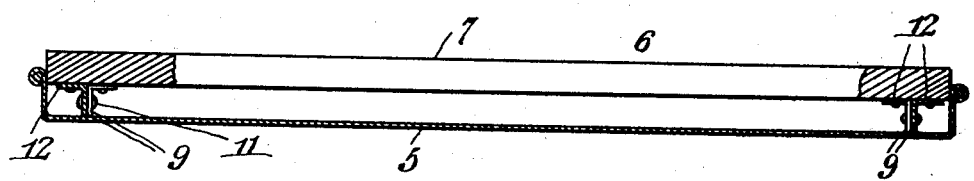
Fig. 3 is a view in longitudinal section taken through the cutting board.
Figure 4:
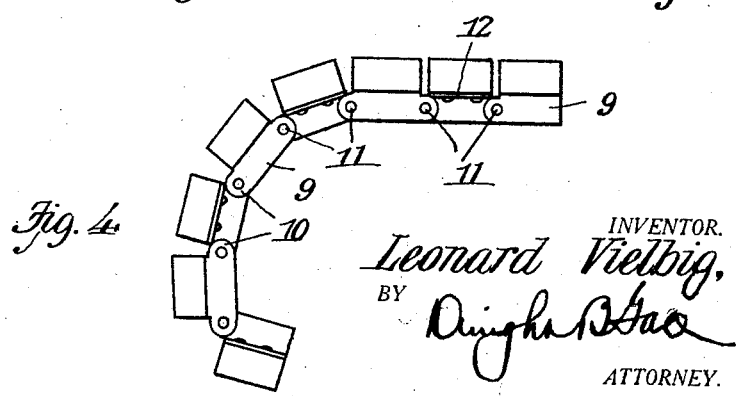
Fig. 4 is a detail end elevation of the table member removed from the supporting pan or tray.

In carrying out the invention, the device consists of a pair of separable members, such members comprising a pan or tray 5 and the cutting table per se 6. The pan is comparatively shallow, and may be of any desired size or shape. In the present instance the pan is disclosed as rectangular, but it will be understood that the same may be circular, oval or of any other desired or preferred shape.

The table member 6 comprises a plurality of slats represented at 7, the same preferably being formed of wood of such nature or toughness as to properly withstand the cutting to which boards of this character are ordinarily subjected. The slats 7 correspond in length to the interior of the pan, and are arranged in spaced parallel relation to provide slots 8 between them. The slats may be of greater or less width than shown, and furthermore, may be spaced closer together or farther apart as desired, it being the gist of the invention to provide in the cutting surface of the table a plurality of slots 8 in order that particles of food stuff or juices therefrom may pass through into the pan 5. The breadth of the table member corresponds with the breadth of the pan.

The several slats constituting the board are at all times maintained properly spaced apart, with their upper surfaces in the same common plane and their lower surfaces disposed preferably a substantial distance above the pan bottom. As the slots between the several slats are comparatively narrow it is apparent that means must be provided to permit thorough cleaning of the adjacent slat edges, in order that the table may be maintained in proper sanitary condition. To this end, the table is removable from the pan and is articulated so as to permit of easy access to all edges and surfaces of the several slats. Each slat 7 is provided near its ends and upon its under-surface with a plate 9, said plates being disposed transversely of the slats and having ends 10 projecting beyond the edges of the slats in overlapping relation with the ends of the plates of the next adjacent slat. Hinge pins 11 connect these overlapping plate ends in substantial alignment with the spaces or slots 8 between the slats.

Each plate member 9 is disposed at right angles to its cooperating slat, and the said plates are of such breadth as to maintain the lower surfaces of the slats spaced a substantial distance above the pan bottom, and also maintaining the upper or operative face of the table spaced above the edges of the pan. This provides ample room between the table and pan bottom for the accumulation of food particles and liquids, and by having the upper face of the table disposed above the edges of the pan the possibility of the knife edge coming in contact with the metal pan edge is overcome. In order that the plates 9 may be rigidly secured to their respective slats, each is provided at its upper edge with a right angularly disposed ear 12 to be secured to the slat bottoms by screws, nails or other securing means. The plates thus arranged are therefore disposed at right angles to the slat bottoms and in addition to connecting the several slats together, constitute spacing members for the cutting table.

The cutting board thus constructed presents a proper and smooth cutting surface, yet permits of food particles and juices free passage from the surface of the table through the slots into the pan. The cutting surface will therefore at all times be maintained free of accumulations of food stuffs and juices. When it is desired to empty the pan, it is but necessary to remove the board, whereby cleaning of the pan may be readily carried out. By having the board articulated in the manner shown, the same may be collapsed in such manner that the various slats may have all surfaces exposed and ready of access for scalding and wiping purposes.

While in the foregoing the cutting board is described as comprising wood slats, it is nevertheless to be understood that they may be made of other material if desired, and while the above is a description of the invention in its preferred embodiments it is nevertheless to be understood that variations in the details of construction and assemblage of parts may be resorted to if desired without departing from the spirit of the invention as defined by the claims.

Having thus described my invention, I claim:

1. In a cutting board, a pan, a foldable and slotted table member of a size and shape to fit within the said pan and having its upper surface disposed above the corresponding edges of the latter, and spacing members maintaining the said table spaced above the bottom of said pan.

2. A cutting board comprising a series of slats arranged in spaced parallel relation, plates secured to the under surface of each slat transversely thereof and projecting at right angles to said slats to maintain said slats spaced a predetermined position from a support when resting upon the latter, the ends of said plates disposed perpendicular to said slats and projecting beyond the lateral edges of the slats to which they are attached, the said ends overlapping the ends of the next adjacent plates, and hinge pins connecting said overlapping plate ends.

In testimony whereof I hereby affix my signature.

LEONARD VIELBIG.